Dec. 29, 1970 HISASHI KANEKO 3,551,813
TIME DIVISION SATELLITE COMMUNICATION SYSTEM
Filed Nov. 16, 1967 3 Sheets-Sheet 1

INVENTORS
HISASHI KANEKO
YUKIO TAKIMOTO
BY
Hopgood & Calimafde
ATTORNEYS

INVENTORS
HISASHI KANEKO
YUKIO TAKIMOTO
BY
Hopgood & Calimafde
ATTORNEYS

Dec. 29, 1970 HISASHI KANEKO 3,551,813

TIME DIVISION SATELLITE COMMUNICATION SYSTEM

Filed Nov. 16, 1967 3 Sheets-Sheet 3

INVENTORS
HISASHI KANEKO
YUKIO TAKIMOTO
BY
Hopgood & Calimafde
ATTORNEYS 3,551,813

TIME DIVISION SATELLITE COMMUNICATION SYSTEM

Hisashi Kaneko and Yukio Takimoto, Tokyo-to, Japan, assignors to Nippon Electric Company, Limited, Tokyo-to, Japan, a corporation of Japan Filed Nov. 16, 1967, Ser. No. 683,639
Claims priority, application Japan, Nov. 19, 1966, 41/75,881
Int. Cl. H04b 1/44
U.S. Cl. 325—4 4 Claims

ABSTRACT OF THE DISCLOSURE

A time division satellite communication system in which an artificial satellite is used solely as a relay station, the time division allocations and referencing taking place at the earth based stations. Each earth station includes means in which the time difference between a slot used as a standard of synchronization and the time slot of that station contained in the received signal is monitored and when the time difference is varied, the amount of variation is compensated to adjust the transmission timing. During synchronization locking of the particular station, continuous pulse codes covering a plurality of frames are transmitted at a lower power than rated power and transmission timing is adjusted so that the pulse code at each frame enters into the corresponding time slot previously allocated to that station. The time slot number modulated into the pulse code is detected over a plurality of frames and after the detection, the transmission is started dependent upon the time slot number. Power is raised to rated power after confirming that the transmission has been effectuated only in the allocated time slot.

BACKGROUND OF THE INVENTION

This invention relates generally to a time division radio communication system and more specifically to a time division satellite communication system comprising a satellite relay station and a plurality of earth stations.

Conventional communication satellites may be categorized. into two types: one is a synchronous satellite which maintains a 36,000 km. high orbit and circles the earth at the speed of the earth's revolution; the other is a medium altitude satellite located in a lower orbit.

The communication satellite which functions as a radio relay station permits two earth based radio stations to communicate with one another if each is in line-of-sight of the satellite, even if the stations have no direct sight with each other. Since it is expensive to launch such a satellite into the space, it is desirable that one communication satellite be utilized simultaneously by many stations, not just two.

The frequency division multiplex method is the one chiefly employed for multiplexing voice channels. However, this method causes cross modulation distortion when relayed by a communication satellite. For this reason, it has been impossible to realize satisfactory multiplex space communication.

The time division multiplex method is also available for multiplexing. However, a body in space such as a communication satellite is not free of variation in its relative position even if it is a synchronous satellite. It has thus been considered difficult to employ the latter method for space radio communication systems. When one satellite is used by two or more ground stations, it is extremely difficult for stations after the first station to initiate communication without interfering with the station already participating in the communication. In order to make it possible to let the second station join the communication system, it is necessary to synchronize the timing of the station with the time-slot allotted to it. In other words, the achievement of synchronization locking is the fundamental condition to realizing communication.

It was first considered possible to allocate the time slot at the start of transmission. This arrangement, however, is disadvantageous since it requires a highly accurate forecasting means and is inapplicable to the medium altitude satellite.

OBJECTS OF THE INVENTION

Accordingly, it is the object of this invention to provide an earth station apparatus which makes it possible to establish a time division radio communication system including a communication satellite relay station and a plurality of earth stations. In other words, it is the object of this invention to provide an earth station with means by which the deviation of synchronization caused by fluctuation of the signal transmission time due to the change in the relative position of the relay station to the earth can be compensated.

It is another object of this invention to provide an earth station with means by which the synchronization locking is accurately and speedily established and securely maintained without interfering with the communication system.

SUMMARY OF THE INVENTION

Briefly, the invention is predicated upon means for monitoring the time difference between the time slot used as a standard of synchronization and the time slot of the station contained in the receiving signal, and when the time difference varies, the amount of variation is compensated to adjust the transmission timing. When the synchronization locking of the station is achieved, continuous pulse codes covering many frames are transmitted at a lower power than the normal, and the transmission timing is adjusted so that the pulse code of each frame enters into the corresponding time slot which has been previously allotted to the station; the time slot number modulated into a pulse code is detected by receiving a plurality of frames and the transmission is started according to the detected time slot number.

The above mentioned and other features and objects of this invention and the manner of attaining them will become more apparent and the invention itself will best be understood by reference to the following description of an embodiment of the invention taken in conjunction with the accompanying drawings, the description of which follows.

Figure 1:
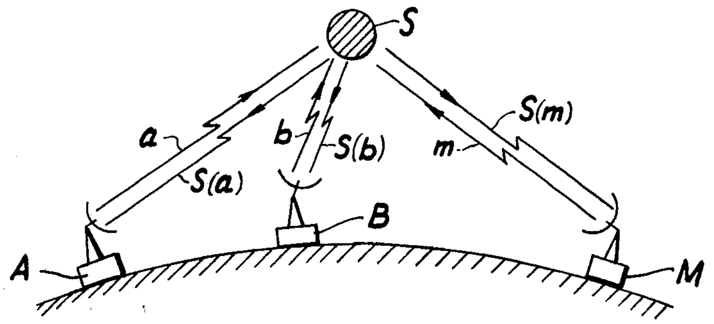
FIG. 1 is a general schematic illustration of the communication system according to the invention.

The communication system of the invention is shown generally in FIG. 1. Relay station S is a synchronous or a medium altitude satellite and earth stations M, A and B are each located within a range available for communication with the relay station. Radio signals *m*, *a* and *b*, transmitted from earth stations M, A and B, are relayed by station S and received as radio signals S(*m*), S(*a*) and S(b) by the respective earth stations. They reach the respective stations at a slight difference in time interval; however, the signals contain information whose contents are the same. While on the communication system of FIG. 1, three earth stations are shown; the number of stations which utilize relay station S may be increased to more than three.

Figure 2A:
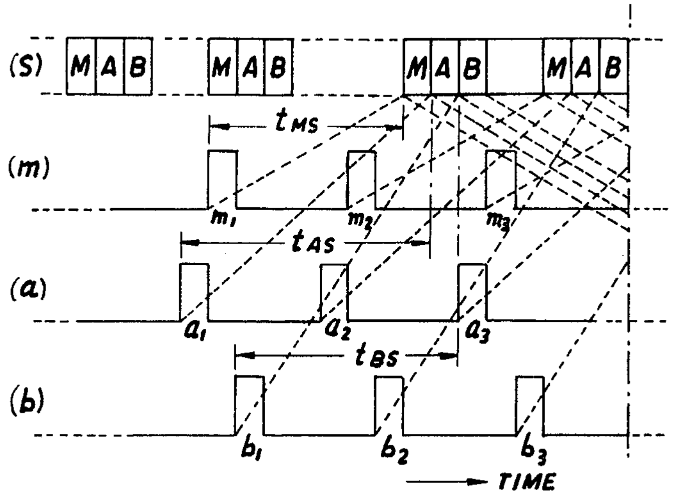
FIG. 2 illustrates waveforms to be used in explaining the time division method of the invention.

In general, the satellite station S merely has the function to relay and amplify the radio signals. Where there is no weight limit on the relay station, it is possible for the relay station to be provided with a means of successively selecting the earth station, thus obtaining a time division communication system. In practice, however, it is impossible to equip a satellite relay with such a selection device. Thus, in order to obtain a time division communication system utilizing a satellite relay station, the radio signals sent to the satellite from the respective earth stations M, A and B should be constructed into a waveform *s* representing a time division multiplex signal (as shown in FIG. 2(A)) at the instant when the signals sent from station M, A and B reach station S. In waveform *s*, M, A and B represent the respective time slots allotted to the earth stations M, A and B, respectively. Specifically, the satellite relay station S amplifies and relays the signal sent from the earth station M at a time slot M, and similarly, amplifies and relays the signals from the station A and B at time slots A and B respectively. The amplified and relayed signal *s* is received by each of the earth stations M, A and B. Each station discriminates and regenerates the signal sent to the station by means to be described later.

As has been described, the relay station S functions only to amplify and relay the received signals, thus the signal transmission time must be predetermined with respect to each earth station to obtain a time division multiplex signal of waveform *s*. As shown by waveform *a* in FIG. 2(A), for example, earth station A must transmit the signal $a_1$ which is to be sent into the time slot A, under a lead of $t_{AS}$ corresponding to the time required for the radio-wave propagation between the relay station S and said station A (approximately 0.12 second for one-way at a distance between earth and the synchronous satellite of 36,000 km.).

Similarly, stations B and M must transmit signal $b_1$ and $m_1$ earlier by $t_{BS}$ and $t_{MS}$ respectively for them to fit in the time slots B and M.

In this example, it is possible to assume a communication system in which the stations M, A and B are synchronized in the form of an average of the clock periods of the respective stations. Earth station M is taken as the master station which serves as a synchonization reference with respect to the whole system. The master station M transmits a signal having the waveform *m* composed of a pulse train whose pulse interval is predetermined. The remainder of the earth stations, i.e., the slave stations A and B, determine the time slots allotted to each station standardizing the signal waveform *m* transmitted from said station M.

If no change is caused in the relative position of the relay station S, each of the radio-wave propagation times $t_{AS}$, $t_{BS}$ and $t_{MS}$ will not vary. Therefore, each signal transmission time at the stations A and B may be previously fixed according to the said signals of waveform *m*. As described, however, said transmission time cannot be fixed in practice. If they were, the time slots will partly overlap and, as a result, mutual interference will be caused among the channels.

It will be appreciated from the description that the master station should first transmit a signal in order to actuate the communication system. Because it is necessary to generate the frame synchronizing pulse signal within the signal of waveform *s*, a synchonizing pulse signal having special code words is included in the signal of waveform *m*, transmitted from the master station M. In order to have earth station A operate in the communication system, each signal must be accommodated properly in the time slot allotted, at the relay station S in the waveform *s*.

Figure 2B:
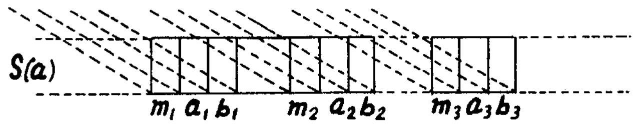

If the relative position of the relay station S is varied, it is necessary for the earth station A to be provided with a means for monitoring time difference between the signal $m_1$ of the master station M and the signal $a_1$ of the station A as shown by the received waveform S(a) in FIG. 2(B); and for correcting the signal transmission time of the station A so that said time difference can be kept constant. Similarly, each earth station must have a means in which the signal *m* of the master station M is received, and the component of the frame synchronizing pulse contained in said signal is taken out. Further, that time difference between the time position given by said component and the predetermined time position of the station extracted from the received signal S(a) or S(b) must be monitored to maintain the transmission time of the station correctly.

In the communication system described, the method of linking earth station A to the system while the master station is in operation (or, generally, to any communication system previously formed among the master station and an earth station other than A) i.e., the method of acquiring system synchronization, is an essential matter to be taken into consideration. This results since if station A suddenly transmits in order to link into the communication system, it becomes probable it will interfere with other channels or disturb the communication system synchronization which has been formed. Therefore, it is necessary to equip each earth station with a so-called acquiring means for the synchronization, the means of which enables the station A to start transmitting the signal *a* to the time slot previously allotted without causing any interference on the communication system. This subject will be further described below.

Figure 3:
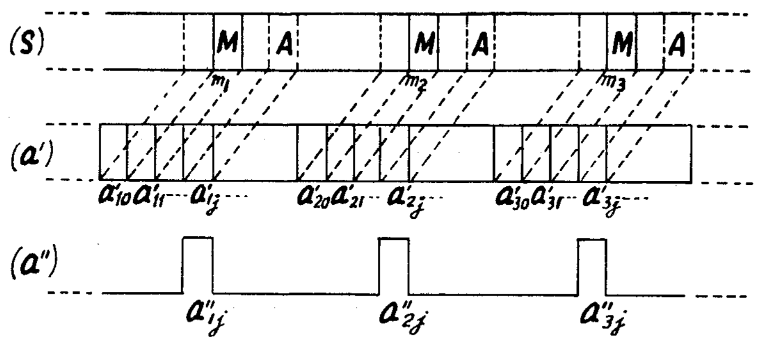
FIG. 3 illustrates waveforms showing the synchronizing locking of another earth station to the time division satellite communication system.

Referring now to FIG. 3, the time slots where the earth station signals are to be transmitted are arranged as shown by the waveform *s*, with the time slot of the master station as the standard at the relay station S. Earth station A receives the signal *s* at first from the relay station S, and extracts the signal *m* of the master station M, then synchronizes the receiving timing system according to the frame synchronizing pulse of said signal *m*. After this, the station A begins transmission of the signal *a'*, which contains the synchronizing signal pulse, at a transmission power sufficiently low so as not to cause appreciable interference with other channels. Normally, not only in a satellite communication system but also in any radio communication system, a certain amount of margin is reserved to maintain good condition of signal receiving even if the attenuation losses in the transmission line is somewhat varied. Since the power of the signal transmitted from the station A is small and, in addition, the receiver of every earth station has a certain degree of margin, the beginning of the transmission at station A does not result in interference with the channels in which the communication is under way.

The signal which is transmitted from the earth station A is composed of specially defined codes which are noise resistant to facilitate the reception at the station A. Such codes may be found in Chapter 7 "Digital Communication with Space Applications" by Golomb et al., published by Prentice-Hall Company. An example is the near random combination of "1" and "0" pulses. For the detection of this pulse, an optimum detection method such as matched filter or correlative detector is used. For such pulse codes, a span covering the length of one to several timeslots is employed, and the pulse code is repeatedly transmitted. Accordingly, all the codes, $a'_{10}$ $a'_{11}$, $a'_{12}$, . . . $a'_{1j}$, $a'_{20}$, $a'_{21}$, $a'_{22}$, . . . are the same pulse codes.

The receiver of the earth station A operates the detector for the time slot previously allotted to the station A by the use of the timing which is synchronized with the master station M. When the pulse codes are extended over a plurality of time slots, station A operates the detector over said plural time slots. In this state, the pulse code is not usually accommodated in the time slot which is previously allocated. However, by gradually correcting the deviated time caused therein at transmission, the pulse code $a'_{1j}$ is the time slot A after the $i$-frame. Since the pulse codes possess the time discriminative characteristics, as mentioned in said reference data, it is possible to lock-in the pulse code into the predetermined time slot using this characteristic.

Furthermore, the time slot number which corresponds to the second suffix of $a'$ (for example; in case of $a'_{1j}$ of the $i$-frame, the suffix $j$ represents the time slot number) is modulated into a pulse code extended over many frames of the transmission signal $a'$ of the earth station A. The time slot number is expressed by a binary number. Thus, the pulse code is reversed or switched to another pulse code according to "1" or "0" in said binary number. In this manner, the second suffix can be known by receiving the signal $s$ over several frames of that time slot. After station A receives the signal $m$ of the time slot M as the standard of synchronization and also receives the pulse code modulated in the manner described above, at the time slot A which has been allotted to the station A, the time slot number $j$ of $a'$ accommodated in the time slot A can be known. That is, it can be seen that the time slot at the earth station A (which should be properly transmitted) is the $j$-th slot.

Next, earth station A stops the transmission of the pulse code contained in $a'$ which is not accommodated in the time slot A of the signal $s$, and transmits a signal $a''$ (refer to FIG. 3) at only the time slot number $j$ at the earth station A.

In station A, the time slot A of the signal $s$ is received later by a time corresponding to the round trip time of the radio wave to the relay station S, after the transmission of $a''$. Station A then detects whether the received time slot A contains the pulse codes $a''_{1j}$, $a''_{2j}$, . . . , or not. In case the pulse codes $a''_{1j}$, $a''_{2j}$, . . . are not contained in the time slot A, this means that the signal $a''$ has been erroneously accommodated in a time slot other than the time slot A. Therefore, the above-mentioned procedure is tried again. When the signal $a''$ sent by the station A is accommodated in the time slot A, the transmission of the station A is properly conducted and, therefore, the transmission power which has been kept low is raised up to the rated value. A long code such as used to cover time slots should be shortened to a predetermined length.

Thus, in the earth station A, both the transmitter and the receiver are synchronized with the synchronization standard of the communication system, and station A is permitted to start communication by use of time slots not engaged.

Figure 4:
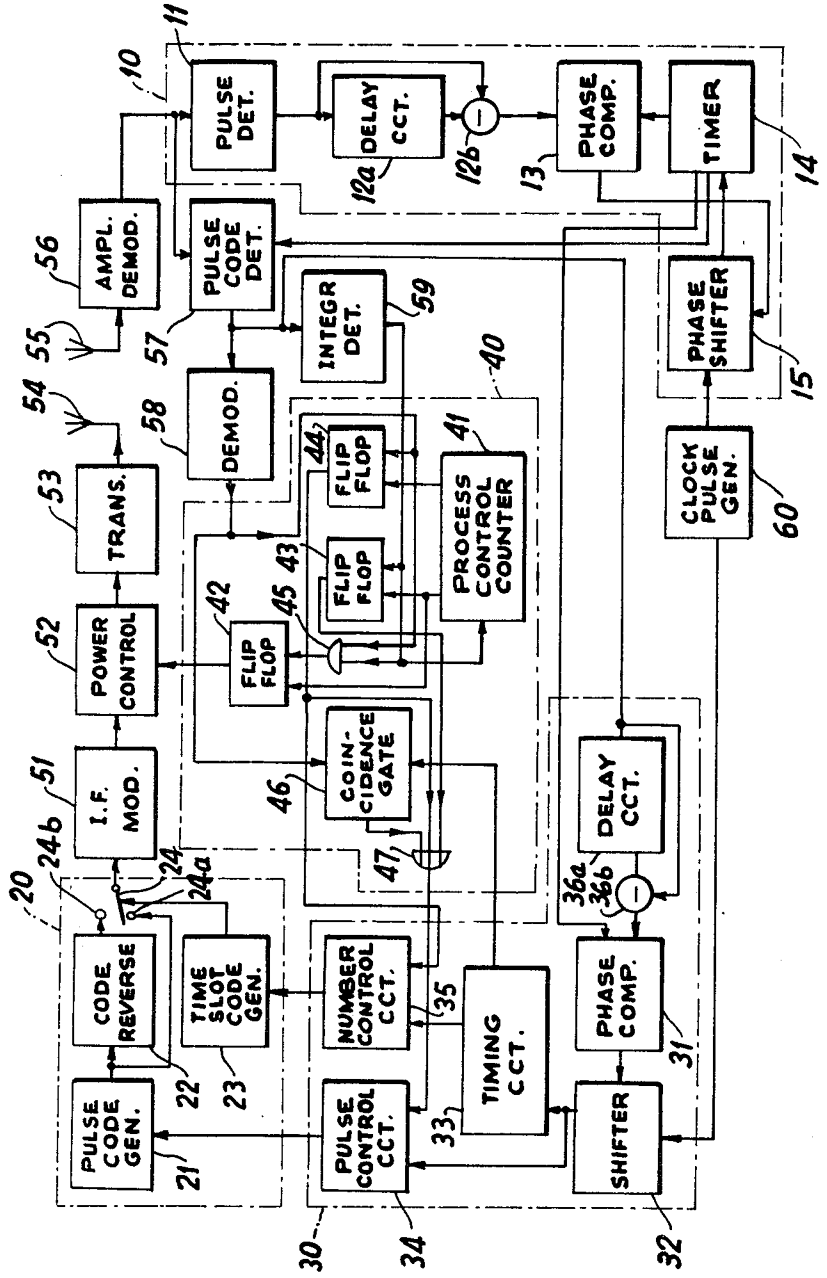
FIG. 4 shows a block diagram of an embodiment of an earth station of this invention.

Referring to FIG. 4, an embodiment of earth station A will be described which is capable of executing the aforementioned procedures.

Antenna 55 receives the radio signal sent from the relay station, and amplifier-demodulator 56 derives a time division multiplex signal by amplifying and demodulating the signal in a usual way. Dashed line 10 embraces components constricting the receiving timing pulse synchronizer which generates the synchronization timing pulse, responding to the signal used as the synchronization standard contained in the time division multiplex signal, or responding to the synchronizing signal transmitted by the master station M. Frame synchronizing pulse detector 11 in the receiving timing pulse synchronizer 10 is employed for extracting the synchronization standard from the received signal S($a$), or detecting the signal $m$ of the master station M by an optimum detection method such as a matched filter or a correlative detector, in a system in which the master station M transmits the frame synchronizing signal.

A differential type matched filter is provided by a delay circuit 12$a$ and a subtraction circuit 12$b$. This circuit is employed to provide the time discriminating function which ascertains the timing position of the frame synchronizing pulse more accurately by differentiating the output of the frame synchronizing pulse detector 11. Such differential type matched filters are described in "Delay-lock Tracking of Binary Signals" by J. J. Spilker, IEEE Transactions on Space Electronics and Telemetry, March 1963, pp. 1–8. Phase comparator 13 conducts a comparison of the relative phases of two input signals, and generates a signal employed for determining whether the time position of transmitting the timing pulse is to be advanced or delayed.

In timing circuit 14, a clock pulse sent from phase shifter 15, which will be described later, is divided to transmit the timing pulse. Phase shifter 15 changes the phase of the clock pulse sent from the clock-pulse generator, to be described, according to the output of said phase comparator 13, and supplies the output to timing circuit 14.

Clock pulse generator 60 generates a pulse whose period is to meet, as correctly as possible, the clock period provided for this radio communication system. Thus, the source of the clock pulse used for the whole of earth station A is provided. Pulse code detector 57 is provided with two matched filters which is able to take out the positive or negative output, and both of which detect the pulse code as true or as a complement for the purpose of selectively extracting the synchronizing pulse code.

Time slot number code demodulator 58 demodulates the time slot number from the time slot number modulated pulse codes. In pulse code integrating detector 59, the transmitted pulse code is examined before modulation—operation by the time slot number code, as to whether the transmitted code is accommodated in each time slot of the waveform S($a$). This examination is conducted covering several frames, and circuit 59 also functions to confirm, after the foregoing process, whether the transmitted code $a''$ (see FIG. 3) is accommodated in the time slot of the station A in the received waveform S($a$) covering several frames. After the confirmation, circuit 59 sends a signal to a locking process controller, to be described later.

Transmitting timing pulse synchronizer 30 accurately designates the transmitting time, and comprises a differential type matched filter (including delay circuit 36$a$ and subtraction circuit 36$b$), a phase comparator 31 and a phase shifter 32 which function similarly to corresponding elements of the receiving timing pulse synchronizer 10. Phase comparator 31 compares the phase of the differentiated signal of the detector output, which signal is transmitted from the station A and contained in the received signal S($a$), through a differential matched type filter, with the phase of the timing pulse sent from the receiving timing pulse synchronizer 10 and ascertains the proper timing position of the station A. According to the result of the comparison, the phase comparator 31 sends a signal to the phase shifter 32 with respect to whether the time position is advanced or delayed. In the phase shifter, the phase of the clock pulse sent from the clock pulse generator 60 is modified according to the output of the phase comparator 31.

Timing circuit 33 provides the timing of the time slot of the transmission channel; the transmission timing of a pulse code used for synchronizing the station A; and the timing representing the time slot used for the time slot number code. Pulse code control circuit 34 controls the time position of the pulse code transmitted from the station A, according to the locking process controller which will be described later, and time slot number code controller circuit 35 controls the time position through the locking process controller when the pulse code is modulated by the time slot number.

Pulse code circuit 20 functions to generate and modulate the synchronizing pulse of the earth station A. Pulse code generator 21 is used to generate the pulse code shown by $a'$ or by $a''$ in FIG. 3. Code reversing circuit 22 reverses the "1" and "0" pulses sent from the pulse code generator 21 so that they will be taken out as a complementary pulse code.

The pulse code generated in the pulse code generator 21 is classified into two types; one is given as the true pulse code to the contact 24*a* of the switch 24, and the other is led as the complementary pulse code to the contact 24*b* of the switch 24, after passing through the code reversing circuit 22. Switch 24 is thrown to the side of contact 24*a* while the earth station is in the normal operation and therefore the regular true pulse code is applied to the intermediate frequency modulator described later. However, in case the station is in the synchronization locking process to be joined to the communication system, and a continuous repetition pulse code is modulated corresponding to the time slot number, switch 24 is driven according to the "1" or "0" of the pulse generated by the time slot number code generator 23. Thus, in this case, switch 24 delivers the true pulse code or the complementary pulse code.

Intermediate frequency modulator 51 operates in the usual manner as do power controller 52, radio transmitter 53, and transmitting antenna 54 to transmit, under controlled power and frequency, the desired signal.

The locking process controller 40 controls the various circuits mentioned above when the station joins this radio communication system. Process control counter 41 is provided to set two flip-flops described later, on the occasion of the locking into synchronization. AND-circuit 45 uses both outputs of the time slot number code demodulator 58 and the pulse code integrating detector 59, as its input. Flip-flop 42 sets the function of the power controller 52 down to a certain predetermined transmitting power depending upon the signal sent from AND-circuit 45. Flip-flop 43 is set by the output of the process control counter 41, and applies a signal to the pulse control circuit 34 through an OR-circuit 47. This flip-flop is to be reset by the output of the pulse code integrating detector circuit 59. Flip-flop 44 is set by the process control counter 41, and operates so that the time slot number code generator 23, which is transmitting the continuous repetition pulse codes, may be regulated by the time slot number code control circuit 35 so that the time slot number may be modulated.

Coincidence gate 46 includes both outputs of the time slot number code demodulator 58 and the transmission timing circuit 33 as its inputs. This gate detects both the position at which the time slot number code is demodulated, and the position of the transmitting timing, and commands the pulse code control circuit 34 to transmit the pulse code during the coincide time interval through OR-circuit 47.

For purposes of clarity, an operative example will be described. Assume that the earth station A joins the communication system, while the master station M is in operation. First, earth station A receives the signal *s* (see FIG. 3) sent from the relay station S through the antenna 55. The signal *m* of the master station M is extracted by the amplifier-demodulator circuit 56. By utilizing the frame synchronizing pulse of the signal, the receiving timing pulse synchronizer 10 brings the receiving timing system into synchronization. Next, the process control counter 41 sets the flip-flops 42 and 43. The flip-flop 42 controls the power controller 52 to lower the transmission power down to a predetermined value. On the other hand, the flip-flop 43 drives the pulse control circuit 34 through the OR-circuit 47 to cause the pulse code generator 21 to generate a continuous repetition pulse code. This pulse code goes through the contact 24*a* of switch 24, and is modulated into a high frequency signal by the intermediate frequency modulator 51. The modulated signal is passed through the power controller 52 and the radio transmitter 53, and is transmitted from the transmitting antenna 54 toward the relay station S.

The signal S(*a*) from the relay station S is received by the receiving antenna 55, and demodulated at the amplifier-demodulator circuit 56. In the signal thus demodulated, the pulse code detector 57 detects the pulse code which has been transmitted from the station A, in the time slot previously allotted to the station A. According to both the time position of the detection and the timing sent from the receiving timing pulse synchronizer 10, the timing of the transmitting timing synchronizer 30, inclusive of the differential type matched filter 36 and the phase comparator 31, is adjusted so that the pulse code sent out will be accommodated just in the time slot of the relay station *s*.

After having confirmed that one of the pulse codes continuously repeated is accommodated in the time slot allotted to the station A, the integrating detector circuit 59 resets flip-flop 43, and simultaneously advances the process control counter 41 by one. The process control counter 41 sets the flip-flop, this causes the time slot number code generator 23 driven by the time slot number code control circuit 35 to modulate the continuous repetition pulse code by the time slot number in the following manner.

The same contents as in the time slot number of the channel timing of the timing circuit 33 are designated as the contents which are to be modulated into the pulse code. This time slot number is expressed by a binary code, and the pulse code is modulated over the frames corresponding to the number of the bits.

Figure 5A:
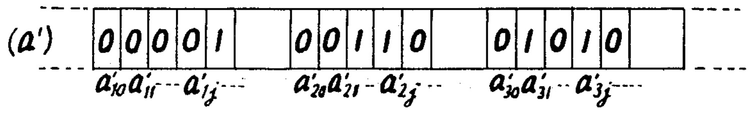
FIG. 5 shows waveforms of the modulated state of the pulse code transmitted from an earth station which is locked in synchronization.
Figure 5B:
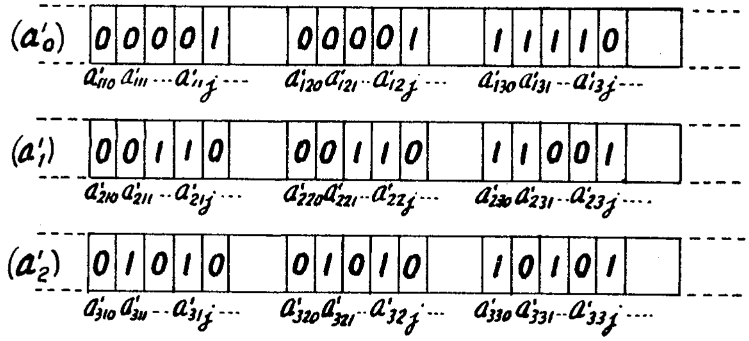

Referring to FIG. 5(*a*), the continuously repeating modulated transmission code $a'$ of the earth station A has "0" in the first frame in the case of the time slot of which the channel time slot number is 0. On the occasion of placing "0" in the first frame, a complementary pulse code is sent out in the time interval of $a'_{10}$ through the switch 24 connected to the contact 24*a*. For the second frame, the pulse code meaning "0" is transmitted again at the interval of $a'_{20}$. For the third frame, an "0" is also transmitted at the interval $a'_{30}$. Suppose now that the time slot number of the *j*-th time slot is 3. In this case, the pulse code which means "0" is transmitted at a period of $a'_{1j}$ for the first frame. For the second and the third frame, "1" of $a'_{2j}$ and "1" of $a'_{3j}$ are transmitted respectively. That is, the time slot number transmitted over three frames is "011," which means 3.

This method is employed to reduce errors which may occur in receiving by developing the method in such manner that plural frames are used to transmit "1" or "0" of the binary system. That is, in $a'_0$-frame in plural frames, a code specially defined is disposed in the *j*-th time slot. For example, in the figure "001" is modulated thereby. In $a'_1$-frame, and the $a'_2$-frame, "110" is arranged. These "001" and "110" are made corresponding to the codes "0" and "1" of the time slot number, and are received by the matched filter of the time slot number code demodulator 58 on the receiving side. The time slot number code demodulator 58 demodulates the modulating signal from the pulse code accommodated in the time slot allotted to the station A.

By this method, demodulator 58 is informed of the position number of the received time slot of the timing circuit 33 of the transmitting timing pulse synchronizer 30, and stores this time slot number. Simultaneously demodulator 58 resets the flip-flop 44, and sends the modulation stop signal to the time slot number code controller 35. Thus, the continuously repeating transmission of the pulse code is stopped. The position previously allotted to the pulse code, which should be transmitted from the earth station A, is at the position of the number demodulated by the time slot number code demodulator through the receiving timing pulse synchronizer 10.

This position of the time slot number and the position of the timing sent from the timing circuit 33 are detected by the coincidence gate 46, and the instruction is applied through the OR-circuit to the pulse code control circuit 34, to transmit the pulse code, for the interval determined by the detection of the time positions. In this state, the signal $a''$ shown in FIG. 3 is transmitted at a low power. After a round trip time $2t_{AS}$ of the radio wave propagation to the relay station S has lapsed, the pulse code integrating detector circuit 59 is operated making sure that the pulse code of the earth station A exists in the time slot previously allotted.

If the confirmation as mentioned above cannot be achieved, this means that the pulse code which is being transmitted is sent in another undesirable time slot. Accordingly, the synchronization locking process must be conducted again after resetting the process control counter 41. On the contrary, if the confirmation is achieved, the output of the pulse code integrating detector circuit 59 is passed through the AND-gate circuit 45, and resets the flip-flop 42. Therefore, the power controller 52 is controlled to raise the transmission power up to the rated value.

Thus, the earth station A is able to join the communication system.

As described in detail, if the relay station S changes its relative position, and consequently the time difference between the signal *a* of the earth station A which has established the transmitting-receiving system, and the signal *m* sent from the master station M is varied, the timing circuit of the transmitting timing pulse synchronizer 30 is operated at once so as to compensate the time difference in accordance with the output of timing circuit 14 contained in the receiving timing pulse synchronizer 10.

While the principles of the invention have been described in connection with specific apparatus, it is to be clearly understood that this description is made only by way of example and not as a limitation to the scope of the invention as set forth in the objects thereof and in the accompanying claims.

What is claimed is:

1. In a time division satellite communication system in which an artificial satellite is used solely as a relay station, a plurality of earth stations each comprising:
- means for extracting a standard frame synchronizing pulse from a received signal;
- means responsive to said frame synchronizing pulse for generating a synchronous timing pulse determining the time allocation of said station;
- means for lowering the transmission power of said station;
- means for generating a continuous repetition pulse code in a plurality of frames at said time allocation;
- a transmitting timing synchronizer;
- means for detecting said pulse code and comparing it to said generated timing pulse for adjusting the timing of the transmitting timing synchronizer to adjust said pulse code into said allocated time slot;
- means for confirming said pulse code is accommodated in said time slot;
- means responsive to synchronization of said pulse code in said allocated time slot for raising the transmission power to rated value and commencing transmission of intelligence at the detected time slot number.

2. The time division satellite communication system claimed in claim 1 wherein said confirming means comprises means for generating a time slot number code modulating said continuously repetitious pulse code.

3. In a time division satellite communication system in which an artificial satellite is used solely as a relay station, a plurality of earth stations each comprising:
- means responsive to a synchronization reference signal for generating synchronous timing pulses determining the time slot allocated to said station;
- means for transmitting continuous pulse codes in said time slots in a plurality of frames;
- means for modulating said pulse code with a time slot number code;
- a pulse code detector for extracting said pulse code from a received signal;
- a pulse code integrating detector for integrating the extracted pulse code;
- a time slot number code demodulator for demodulating said time slot number code from said detected pulse code;
- a transmitting timing pulse synchronizer for comparing phases of pulse signals from said pulse code detector and from said synchronous timing pulse generating means designating the desired transmission time;
- means for generating a transmission timing pulse in response to a signal from said transmitting timing pulse synchronizer;
- a locking process controller responsive to the outputs of said time slot number demodulator and said pulse code integrating detector for lowering the transmission power to a predetermined value where synchronization is correct;
- and means coupled to said process controller for controlling the timing of the pulse code generation and the timing of said timing slot number code at said transmitting timing pulse synchronizer.

4. The time division satellite communication system claimed in claim 3 further comprising means responsive to synchronization of said pulse code in said allocated time slot for raising the transmission power to rated value and commencing transmission of intelligence at the detected time slot number.

References Cited

UNITED STATES PATENTS

| | | | |
|---|---|---|---|
| 3,315,164 | 4/1967 | Ferguson | 325—4 |
| 3,320,611 | 5/1967 | Sekimoto | 343—6.5 |
| 3,418,579 | 12/1968 | Hultberg | 325—52 |

ROBERT L. GRIFFIN, Primary Examiner

K. W. WEINSTEIN, Assistant Examiner

U.S. Cl. X.R.

325—62, 65; 343—7.5